United States Patent [19]

Treat

[11] 4,141,425

[45] Feb. 27, 1979

[54] MEANS FOR GENERATING ELECTRICAL ENERGY FOR VEHICLE

[75] Inventor: Russell T. Treat, Edwardsville, Ill.

[73] Assignee: L. L. Payne, Beverly Hills, Calif.

[21] Appl. No.: 711,541

[22] Filed: Aug. 4, 1976

[51] Int. Cl.² ............................................. B60L 11/18
[52] U.S. Cl. ..................... 180/65 DD; 64/11 R; 115/3; 136/89 AC; 180/65 B; 290/55; 310/254
[58] Field of Search ............ 180/65 R, 65 E, 65 DD, 180/65 D, 65 C, 65 B, 65 A, 57, 54 F, 60; 64/11 F, 11 R; 136/89 AC, 89 PC; 310/254; 290/55, 44; 115/34 R, 3

[56] References Cited

U.S. PATENT DOCUMENTS

| | | | |
|---|---|---|---|
| 422,999 | 3/1890 | Thomson et al. | 310/254 |
| 669,573 | 3/1901 | Bliss | 310/254 |
| 1,115,413 | 10/1914 | Douglas | 180/65 R X |
| 1,832,808 | 11/1931 | Grier | 115/34 R |
| 1,903,307 | 4/1933 | Gillio | 180/65 DD X |
| 1,978,939 | 10/1934 | Guy | 64/11 F |
| 2,326,451 | 8/1943 | Fawick | 64/11 F |
| 3,241,019 | 3/1966 | Gross | 180/65 R X |
| 3,419,434 | 12/1968 | Colehower | 136/89 PC |
| 3,444,946 | 5/1969 | Waterbury | 180/65 R |
| 3,451,469 | 6/1969 | Hall et al. | 180/65 R |
| 3,556,239 | 1/1971 | Spahn | 180/65 A |
| 3,621,930 | 11/1971 | Dutchak | 180/65 DD |
| 3,713,503 | 1/1973 | Haan | 290/55 |
| 3,713,504 | 1/1973 | Shimer et al. | 180/65 C |
| 3,828,880 | 8/1974 | Smith | 180/65 B |
| 3,874,472 | 4/1975 | Deane | 180/65 C |
| 3,878,913 | 4/1975 | Lionts et al. | 290/44 X |
| 3,917,017 | 11/1975 | Deane | 180/65 C |
| 4,018,051 | 4/1977 | Gay | 290/55 X |

Primary Examiner—Joseph F. Peters, Jr.
Assistant Examiner—Milton L. Smith
Attorney, Agent, or Firm—Paul M. Denk

[57] ABSTRACT

Apparatus for generating electrical energy useful for powering of the electrical apparatuses associated with the operations of a vehicle, boat, residence, or other structure, including a bank of batteries associated with one of said structures and provided for furnishing the electrical energy necessary for its operations, an electrical energy producing solar panel operatively disposed with the structure for creating electrical energy for recharging of its bank of batteries, and, an impellor driven alternator, the impellor being rotated through the efforts of air passing thereby, providing also for selectively recharging of the bank of batteries of one of the identified structures. In the preferred instance, the structure comprises an electric powered vehicle, incorporating front and rear wheels, with a variable speed direct current electrical motor associated with the said wheels, gearing interconnected between the motor and the wheels, with the solar panel or alternator charged batteries conducting the electrical energy to the motor to attain its revolving and the consequent rotation of the vehicle wheels for inducing movement.

35 Claims, 20 Drawing Figures

MEANS FOR GENERATING ELECTRICAL ENERGY FOR VEHICLE

BACKGROUND OF THE INVENTION

This invention relates generally to the generation of electrical energy, and more particularly, pertains to the selective use of solar and air operated instrumentalities for use in recharging of batteries for providing pollution free and near limitless electrical operations to various apparatuses.

With the acknowledged advent of depleting sources of energy, particularly in the petroleum and natural gas fields, renewed interest of a more feasible scope has been reactivated in the harnessing of solar energy, and wind or air pressure for inducing rotation of a turbine and its associated generator, so as to provide a more natural source of physical energies that may be translated into electrical energy for providing the power for operation of various apparatuses. Two examples of the ongoing experimentation and development of means for converting both solar and wind power into electrical energy can be readily seen in the various style of solar heated homes that are now being experimentally built and publicized, as for determining the feasibility of their operations, in addition to the concept of utilizing wind or atmospheric forces for pivoting a fan to achieve generated electricity for operating an automobile motor.

Examples of the latter type of development with respect to the automobile is shown in the U.S. Pat. No. 3,878,913, wherein there is disclosed a specific style of fan that is turned through its exposure to a large volume of air as thrust against the frontal portion of the automobile during high speed travel. This fan then rotates a generator that couples with electrical battery means to attain a recharging. Another example of the contemporary development of turbine functioning vehicles is shown in the U.S. Pat. No. 3,713,503, wherein a fan is rotated by means of air pressure, and which likewise actuates a series of generators associated with a drive belt so as to provide electrical charge for driving an automobile. Additional examples of attaining vehicle drive indirectly from electricity, and particularly such as acquired from batteries, are shown in the U.S. Pat. Nos. 3,874,472, 3,556,239, 3,828,880, and 3,917,017.

Another example of the harnessing of energy for attaining vehicle operation is shown in the U.S. Pat. No. 3,444,946, wherein there is disclosed the use of solar power acting upon miniscule cells so as to create electrical charge for inducing operations of individual motors associated with the various wheels of the vehicle, or for recharging of its batteries. This patent also contemplates the use of a small flywheel upon which the force of air impinges, and which flywheel couples with a generator so as to achieve charge for operations of the motors associated with each said wheels, or to attain battery recharging.

All of the patent disclosures heretofore identified show various forms of development of electrically operated vehicles, attained from their respectively designed apparatuses mounted within their specific vehicles for the purpose of creating either wind or solar induced energy for either achieving direct operation of the shown vehicles, or for recharging of batteries associated therewith. Applicant, in reviewing all of these disclosures, has entertained very serious doubt as to the feasibility of the operations of the electrical vehicles, either because of the small size capacity of the shown solar or air operated instrumentalities included for providing the charge of power to operate the vehicle, such as shown in the U.S. Pat. No. 3,444,946, or because of the high coefficient of friction that prevails in the cooperation of the various operative components associated with the charge inducing mechanisms, such as shown in the U.S. Pat. No. 3,713,503. And, in view of his study made respecting these prior art type of apparatuses, applicant has designed an energy creating solar and impellor operating system that functions as in the latter instance, under very low frictional coefficients so as to produce ample energy under highly efficient circumstances, and which has provided nearly unlimited range of mileage as when installed with a road vehicle.

It is, therefore, the principal object of this invention to provide mechanism for creating electrical charge from the combination of both large capacity solar plates and near frictionless actuated impellor means that, in combination, can recharge banks of batteries so as to provide an ample capacity of electrical charge for maintaining near limitless operations of a vehicle, and particularly an automobile.

Another object of this invention is to provide a total energy source that can furnish recharging energy to a significant bank of batteries that simultaneously may provide electrical charge for the driving of a large capacity electric motor, that may function as the engine for any type of moving vehicle, such as the automobile, truck, tractor, boat, and related type apparatuses.

Another object of this invention is to provide a specially designed increased horsepower electrical motor that is of significantly reduced weight than motors to be found in the prior art, and therefore, greatly lessens the weight drag upon the vehicle in which it is installed, and hence reduces to some extent the amount of electrical energy consumed while achieving efficient vehicle movement.

A further object of this invention is to provide means for creating both front and/or rear wheel drive for a vehicle through the operations of uniquely designed gearing mechanisms that translate electric motor revolutions into wheel drive.

Yet another object of this invention is to provide a unique noise absorbing coupler that interconnects between the aforesaid electrical motor and the drive translating gear means, and which coupler is designed for greatly dampening the noise associated with electrical motor revolutions and the vibrations generated therefrom.

A further object of this invention is to provide an electrical system that incorporates more than one bank of batteries that may be alternately injected into the circuitry of a functioning vehicle so as to always provide a highly charged energy source for producing peak electrical power for operation of the vehicle at all times.

Another object, in view of the just discussed foregoing result, is to provide a circuitry for converting between various banks of electrical batteries for furnishing constant electrical energy to a motor for sustaining its energization, while at the same time, providing for a recharging of the inactive bank of batteries included within the electrical system of the vehicle.

Another object of this invention is to provide an accelerator system for an electric vehicle wherein additional charge can be smoothly applied to charge a variable speed direct current motor without any noticeable interference in sequence of operations as more amperage is cumulatively applied or deducted from one or more batteries to attain a change in vehicle velocity.

Another object of this invention is to provide a combination of heating and cooling means for the vehicle that may function from the various electrical components included for more primary purposes within the circuitry of the electrical motor driven vehicle.

An additional object of this invention is to provide a combination of solar and wind generated electricity for recharging of banks of batteries that are useful for providing a totally electric residence.

Yet another object of this invention is to provide an apparatus incorporating a series of precisely arranged solar plates which are conveniently and protectively packaged within a stable framework and recessively mounted either upon a vehicle, or exposed on a residence, so as to provide a source of electricity from such energy for powering of various appliances connectable to charged batteries.

These and other objects will become more apparent to those skilled in the art upon reviewing the summary of this invention, and upon undertaking a detailed study of the description of the preferred embodiment in view of the drawings.

SUMMARY OF THE INVENTION

This invention comprehends the provision of a total energy package for the operation of various apparatuses, which apparatuses may be associated with a residence, or a moving vehicle, such as an automobile, tractor, truck, or even a motorboat. The concept of the invention, as in its use in a vehicle, is to provide a total replacement of the normally utilized internal combustion engine, and its need to consume petroleum products to maintain its operation, with potential sources of energy that are low cost and plentiful in their existence. For example, and as previously briefly abstracted, the invention contemplates the conversion of wind or atmospheric air movements into a source of power for operating an alternator and therein generating electricity, or the direct conversion of sunlight into solar energy, with both of the generated electricities preferably being conducted for recharging banks of electrical batteries that are useful for driving the necessary instrumentalities to maintain the operations of the aforesaid type of apparatuses. For example, in the home, electrical energy is now being urged as a means for providing the total electrical home concept, which means that all heating, cooling, and the charge for operating various appliances therein may be achieved solely from electricity. Likewise, solar energy and its conversion to electricity can supply the same energy in abundance for simultaneously maintaining a charge upon the said bank of batteries that supplies the electrical energy for the same purposes.

In the adaptation of this invention to a vehicle, and of the variety of types as previously explained, the invention overall comprehends the use of both solar and wind generated electricity, once again, for maintaining the charge upon a bank or more of batteries, and which batteries supply the electrical energy primarily for charging of a specially designed electric motor that has been found to function highly effectively in providing the primary mode of power to a vehicle. In a case of an automobile, the invention further includes the construction of various instrumentalities, within the mechanisms of the vehicle, that function to complement the operations of the specially designed electric motor in furnishing total vehicle operations, such as the use of a particularly designed transmission and/or a modified form of differential gearing, primarily for providing either automatic or manual control to the vehicle, regardless whether the vehicle be of the front wheel or rear wheel type of drive. And, so that the operations of the motor do not generate too detrimental vibrations that can pervade throughout the vehicle, a specially designed vibration absorbing coupler interconnects between the output shaft of the motor and the transmission or differential gearing, so as to cushion the noises of vibration to a minimum and provide for quietude in the vehicle functioning, and enhance its comfort performance.

The application of mechanisms for converting wind or air forces into the provision of electrical energy for recharging of the vehicle batteries includes the use of a specially designed impellor that partially mounts within custom designed ductwork that is disposed, preferably, at the lower side of the automobile, although such ductwork can also be disposed proximate the roof of the same. The impellor is bearing mounted stably to the side frames of the vehicle, thereby providing for its rigid support, and proximate one end of the impellor, and connected either by a direct connection or by an intergearing connection, is an alternator that turns simultaneously under the influence of the rotation of said impellor so as to generate a quantity of electrical energy for charging of the vehicle batteries. Since the impellor is disposed approximately from side to side of the automobile, its structure encounters a high degree of wind to blade force due to the significant amount of air per square inch exposure of the blades than can be found in prior devices. And, as has been found through experimentation and development, the style of impellor utilized in this invention, including a series of generally radially disposed arcuate blades or vanes, operates most effectively when the vehicle is travelling in the vicinity of 35 miles per hour, and at that speed can provide a full charge to the bank of batteries from the associated alternator. Since the impellor is mounted on bearings, it is near frictionless in its rotation and can thereby commence to generate charging electricity even at lower speeds than that previously defined, although, desirably, a cruising speed of 35 mph produces the most desirable results.

The alternator associated with the impellor is designed as a three phase, direct current excited unit, and such an alternator, rather than a generator, has been found more satisfactory in performance due to the lower drag encountered as a result of the excitation charge being conducted to its armature. Because the charging rate of the alternator is controlled by the amount of voltage being applied to its exciter coils, the vehicle speed can be conveniently coordinated with the revolutions per minute of the impellor itself so that proper excitation of the armature can be sustained for allowing a rotation of said armature under the influence of a minimum of electromotive force. It has been found through experimentation that if a high amount of voltage is applied upon the direct current exciters at low impellor speeds, that the wind force would not be enough to turn the impellor vanes due to the inherent alternator drag. Therefore, the lower voltage must be applied upon the exciter coils of the alternator at lower vehicle speeds, and it follows that a coordinately applied larger voltage must be impressed upon the exciter coils at increasing vehicle speeds so as to maintain this frictional drag to a minimum.

Another feature of this invention is the especially designed electric motor that is used for providing a mechanical drive for the invention, particularly when it is installed within an automobile, truck, tractor, or the like. Obviously, the lesser the weight of the various operating components provided within the vehicle, the lesser there will be the electricity demands made by the motor to attain a drive for its vehicle. Hence, the electric motor of this invention has been specially designed with the concept in mind of eliminating the bulk of its weight where such is feasible, and it has been found that for the stator portion of the motor a specially designed cast frame that surrounds the perimeter of the armature proximately its midpoint has been successful in providing the full support necessary for holding of the field windings in proximity with the said armature even when exposed to the enormous electromotive forces. The motor has been designed as a variable speed direct current motor, which may have a horsepower within the vicinity of 20, although horsepower requirements from the motor may vary from as low as 10 to 30. Furthermore, since it is a variable speed motor, the potential upon the motor may vary from 48 volts to 72 volts, depending upon its speed of operation and load demands, while the amperage may vary from 30 to 125 amps. And, when the motor is operating at the upper limits of its range, as just set forth, the enormous electromotive forces surrounding the motor and armature exhibit a very high intensity that places an enormous forces upon the frame, but which frame, as previously commented, preferably is cast to withstand such forces, while at the same time minimizing the weight of the normally required three hundred pound housing that generally forms the stator portion of a comparable standard motor of this size and capacity as used in the trade. The motor has been further designed so as to incorporate additional coils conveniently placed around certain fields so as to generate residual charge that may be utilized for recharging those batteries that are associated with and provide electrical energy for operation of the accessories provided in the vehicle.

The solar energy charger of this invention includes a series of solar cells or plates that are conveniently stacked into banks and arranged at particular angles so as to provide maximum exposure to the sunlight over a sustained time period. Preferably, since the motor of this invention operates at voltages in the vicinity of 48 to 72 volts, the solar energy charger of this invention incorporates a sufficient number of silicon formed plates that produce an output of approximately 48 volts, at 8 amps current, so as to conveniently charge the various banks of batteries associated with the vehicle. Furthermore, the solar unit is housed in a highly polished metal container, which is hydro-vented, so as to minimize any condensation within the housing and which would have a tendency to detract from the full exposure of its silicon plates to the sunlight.

The circuitry of the invention, and particularly where it is installed within a vehicle, such as an automobile, includes at least a pair of banks of electric batteries, there being anywhere from five to six batteries per bank, and which batteries are generally identified as the main and auxiliary batteries for supplying the electrical energy to the electric motor. Each bank of batteries has associated therewith a series of stepping relays that cooperate with an accelerator pedal that can activate each of the successive relays in cumulative fashion to add additional battery power from a bank for energizing of the variable speed motor and to increase its speed, and consequently, the velocity of the vehicle. Various other relays are provided within the circuitry and upon functioning allow the electrical motor to be energized by the main bank of batteries, while the auxiliary bank will be exposed to recharging through the operations of the impellor driven alternator and the solar energy plates. Likewise, upon actuating another of said charging relays, the main batteries may be shut off, and exposed to recharging, while the auxiliary bank of batteries provide the necessary energy for driving the variable speed motor.

The invention further recognizes the inability of any inventor to produce the perfect machine, and therefore, while the solar and recharger impellor driven alternator may provide close to sufficient charge, or even overcharge, for recharging of the various banks of batteries, and which charged batteries may provide adequate power to the electric motor to attain drive for the vehicle, in some instances, such recharging instrumentalities may yet require supplemental help for maintaining the charge upon the said battery system. Therefore, the invention further includes a small gasoline driven engine that may turn its own alternator for achieving selective and supplemental recharging of the various batteries.

DESCRIPTION OF THE PREFERRED EMBODIMENT

Figure 1:
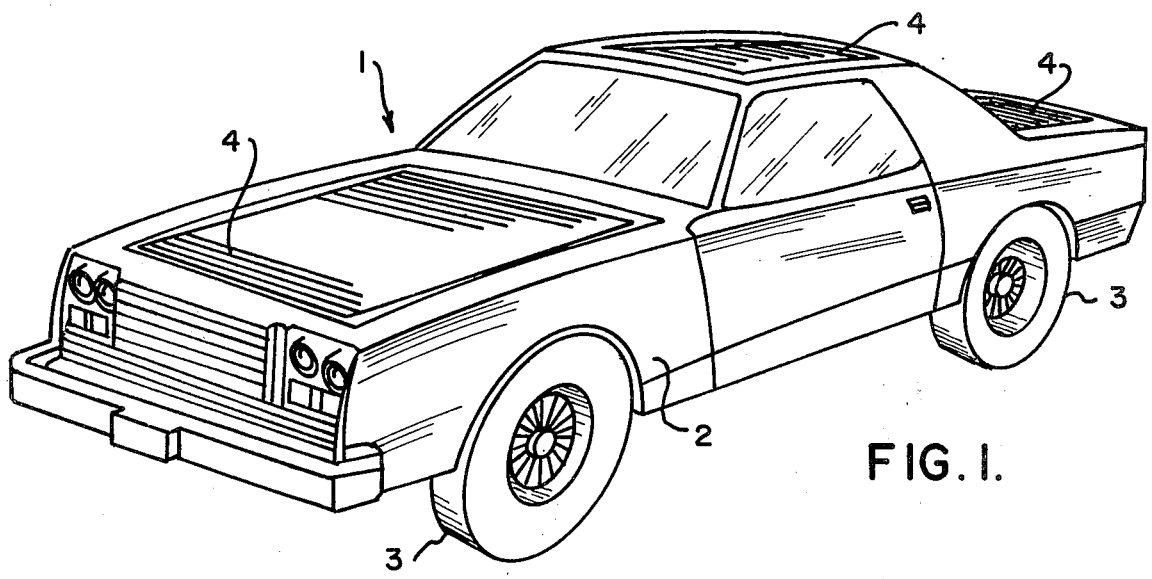
FIG. 1 discloses an isometric view of a vehicle, namely an automobile, designed incorporating the components of this invention for furnishing nearly unlimited range of travel during its operations.
Figure 2:
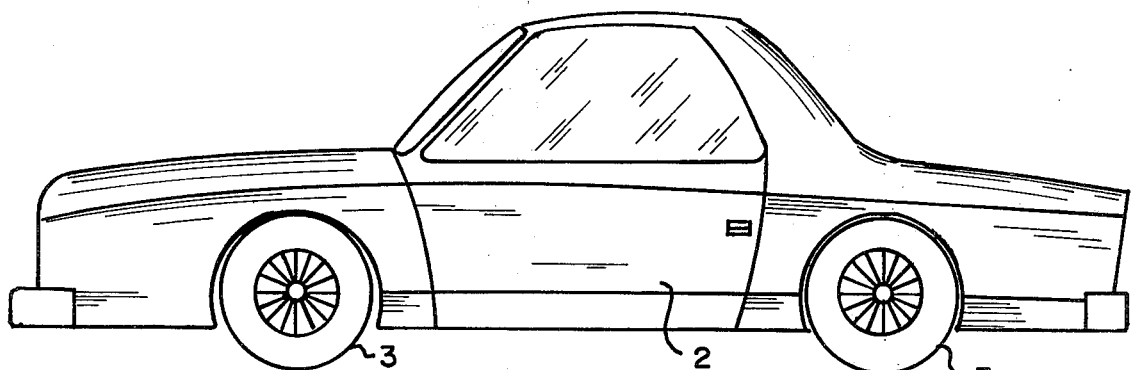
FIG. 2 provides a side view of the vehicle of this invention.
Figure 3:
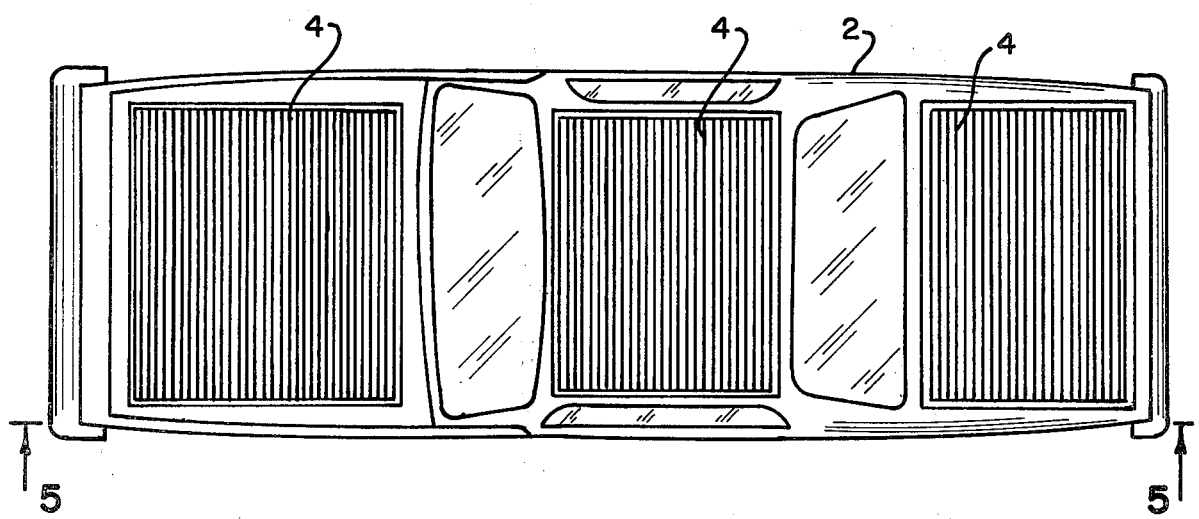
FIG. 3 provides a plan view of the vehicle of this invention, showing the various locations for the solar recharger.

In referring to the drawings, and in particular FIGS. 1 through 4, there is disclosed a vehicle 1, namely an automobile, wherein the various instrumentalities of this invention are incorporated so as to provide a comprehensive electrical motor driven automobile that is generally free of the use of any petroleum products to attain its drive. Although the preferred embodiment of this invention is described and analyzed with respect to the automobile 1, it can be seen from FIGS. 17 and 18 that such components can also be incorporated within other vehicles, such as a boat, or by referring to FIG. 19, such instrumentalities can be modified for operating within the residence to provide for the total electric home.

As seen in FIGS. 1 through 4, the vehicle is normally of the standard configuration having the body 2 that rides upon its wheels 3, and which may be propelled by either a front wheel or rear wheel drive, as known in the trade. As it can also be seen in these figures, the solar energy recharger 4 may be conveniently recessed mounted upon the roof of the vehicle, and/or upon its hood or trunk lid. But, preferably, and as will be subsequently explained, this solar energy converter is recessed within the roof of the vehicle, and thereby is obscured from lateral view so as to be generally unnoticeable, but at the same time, provide for its stable mount upon a stationary portion of the vehicle that receives little or no exposure to manual manipulation such as occurs with the hood or trunk portions of a standard vehicle.

Figure 5:
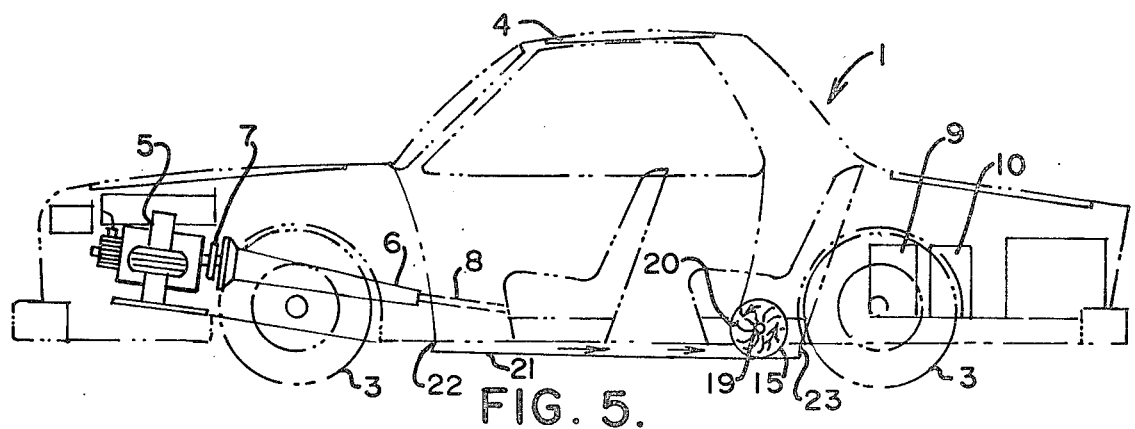
FIG. 5 provides a phantom view of the vehicle of this invention, and therein disclosing the various instrumentalities utilized for providing and furnishing electrical energy to its variable speed motor.
Figure 4:
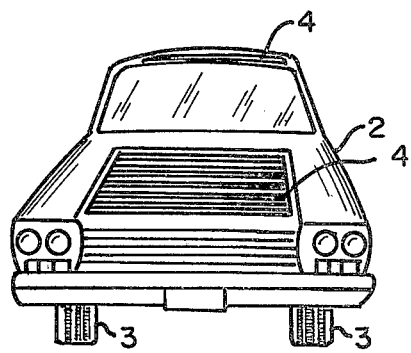
FIG. 4 furnishes a front view of the vehicle of this invention.
Figure 6:
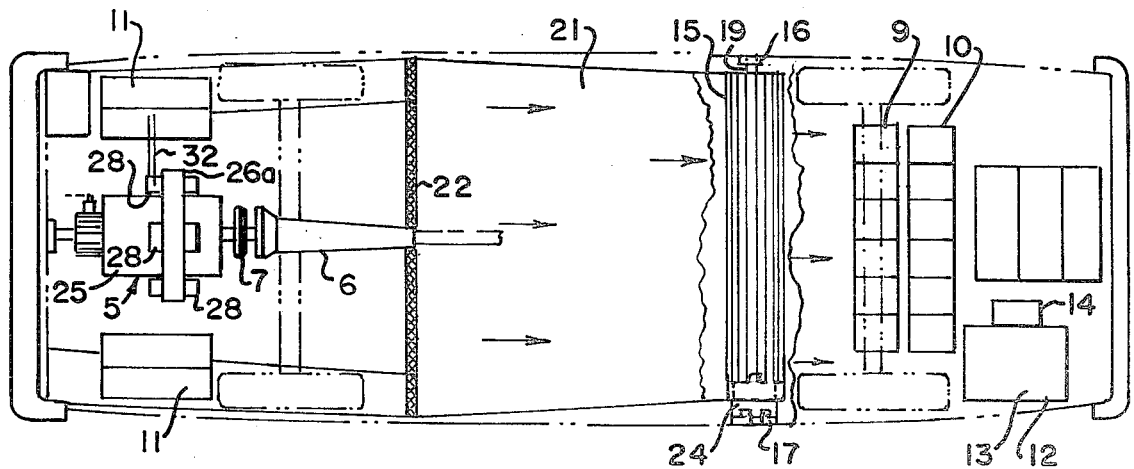
FIG. 6 discloses an underside view of the vehicle of this invention, as shown in FIG. 5.

In referring to FIGS. 5 and 6, the internally disposed components of this invention that furnish drive to the vehicle are readily disclosed. As can be seen, the vehicle incorporates an electric motor 5 at its frontal portion and in a position that is normally occupied by the usual internal combustion engine for such a vehicle. Connecting with the shaft of the motor is the transmission 6, having a noise absorbing coupler 7 arranged intermediate thereof, and which is designed to provide a cushioning of the vibrations generally generated within the bearings and brushes of a large capacity motor particularly when mounted within an automobile. Extending rearwardly of the tranmission 6 is the drive shaft 8 that extends rearwardly to the rear wheels 3 of the shown vehicle so as to provide for a rear wheel drive. Obviously, a modification could be made to the transmission 6, and its drive shaft 8, so as to incorporate a front rear drive in the vehicle, or perhaps even provide for four wheel drive as may be found in certain vehicles, such as the Jeep.

Also disclosed within FIGS. 5 and 6 are the banks of main and auxiliary batteries 9 and 10, respectively, which are provided for alternately furnishing electrical energy to the motor 5 to maintain its operations. One or more accessory batteries 11 may be provided within the automobile so as to furnish a charge to the accessories normally included within an automobile. And, also disclosed within the vehicle is a supplemental charging apparatus 12 comprising a small capacity motor 13 that turns an associated generator 14 for creating supplemental electrical energy for recharging of the various main or auxiliary batteries in the event that the wind charging impellor or the solar energy converter fail to provide sufficient energy for the adequate recharging of said batteries. This motor may comprise a standard five horsepower motor, and drive a generator which may have an output in the vicinity of 250 amps, at 48 volts potential. Preferably the motor 13 herein will incorporate an aluminum housing so as to reduce its weight within the vehicle.

As also shown within FIGS. 5 and 6, arranged conveniently under the rear seat of the vehicle is the air or wind driven impellor 15 of this invention. This component incorporates a finned or vaned impellor that extends approximately the full width of the vehicle, being mounted by means of at least two bearings 16 and 17 approximate its sides to the side frames of the vehicle, and therein produce a near frictionless rotation for the impellor during its exposure to the influence the air passing therethrough. These vanes 18 may be of a lineal design and radially disposed from the shaft 19 of the impellor, or said vanes may be of arcuate design, as at 20, in their position upon the impellor shaft 19, as shown in FIG. 5.

As can also be seen from these FIGS. 5 and 6, the underside of the vehicle, intermediate its set of front and rear wheels, is provided with formed ductwork 21 having an intake opening 22, with the width of said intake being approximately the width of the vehicle itself, and having an egress portion 23 provided slightly rearwardly from the positioning of the mounted impellor 15. A screen may be provided across the intake as shown to prevent the entrance of any debris therein. The lower portion of the vanes 18 or 20 of the impellor extend through an opening in said ductwork so that as air passes through said ductwork it is readily exposed to the vanes of the impellor so as to provide for its rapid rotation. Provided at one side of the impellor 15 is an alternator 24, and which either has a common shaft with the shaft 19 of the impellor, or perhaps may have a geared connection (not shown) therewith, so that a turn of the impellor will likewise induce a simultaneous rotation of the armature of the said alternator. This alternator is designed to produce approximately 48 volts of potential, as an averaged minimum, and depending upon the speed of its revolution, may even produce a potential as high as 72 volts, and having a rectified amperage output. The charge from this alternator is selectively impressed upon either the main or auxiliary battery packs 9 and 10 to attain their recharging in a manner as will be subsequently described.

Figure 8:
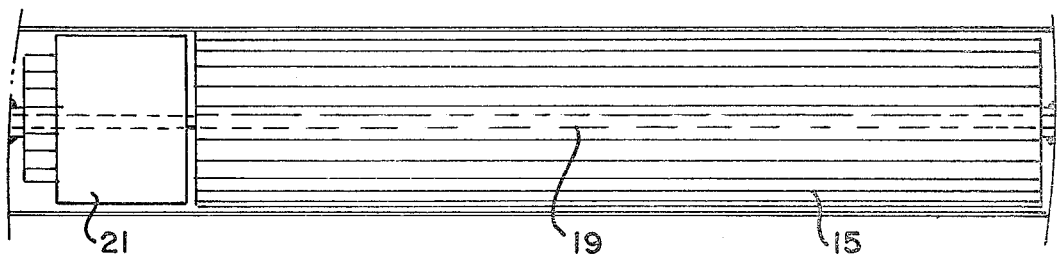
FIG. 8 furnishes a longitudinal view of the impellor and its associated alternator utilized in this invention.

FIG. 8 also discloses the alignment of the alternator 24, arranged totally laterally of the vaned impellor 15, and how they share a common shaft 19 throughout their extent.

Figure 7:
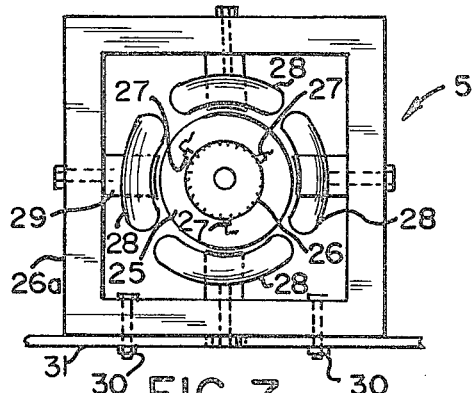
FIG. 7 provides a front view of the specially designed electric motor utilized in this invention.

The electric motor 5 of this invention is more accurately disclosed in FIGS. 6 and 7, and this motor is of the type and capacity as previously analyzed in the summary of this invention. It includes an armature 25 having the commutator 26 associated with the three brushes 27, wherein electrical energy is conducted to the armature during motor operations. The stator of the motor includes a frame 26a, which may be formed from cast iron or the like, so as to provide an integral structure that surrounds the periphery of the said armature, and likewise provides full support for the field windings 28. Brackets 29 secure the said field windings 28 spacedly around the perimeter of the frame 26a, and rigidly secure these windings in close proximity around the circumference of the said armature. As can also be seen in FIG. 6, the frame 26a surrounds only approximately the midpoint of the armature 25, and does not totally envelope the said armature, so that not only can the motor be rapidly air cooled as during its operations, and through the movement of the vehicle, but that significantly reduced weight is attained for the motor as compared to similar type direct current motors available upon the market, particularly those where the stator includes a cast cylinder that totally surrounds such a motor. The bottom leg of the frame 26a is secured as by the fasteners 30, or by welding, to a plate 31 that is likewise rigidly secured on the unibody frame of the vehicle. Hence, the variable speed motor of this invention is very securely mounted in place with respect to its positioning within the framework of the automobile.

This motor 5 is designed, and has operated, to provide a cruising speed of 55 mph for the vehicle, and can, upon an increase in voltage, easily move the vehicle as high as 85 mph, while at the same time provide and generate ample potential for recharging the inactive batteries.

It may also be commented that one field winding 28 of this invention may include some additional windings, or coil, and connect by means of circuit lines 32 to the accessory batteries 11, and furnish their constant recharging as during motor functioning.

Figure 13:
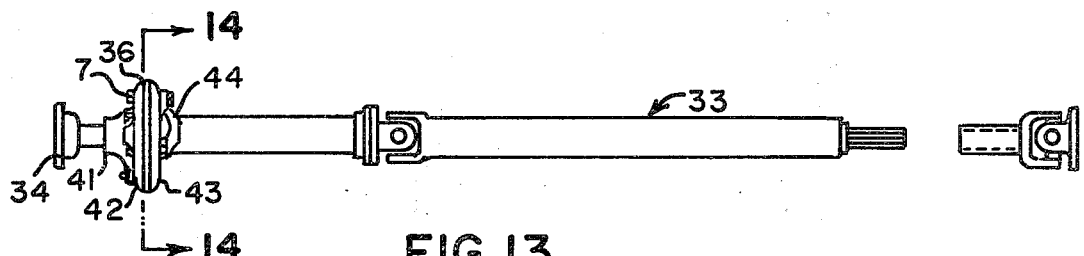
FIG. 13 provides a longitudinal view of a drive shaft for a rear wheel drive associated with the vehicle of this invention, and further discloses its vibrations absorbing coupler which functions to cushion the noises of vibration associated with the operations of the engine of this vehicle.
Figure 9:
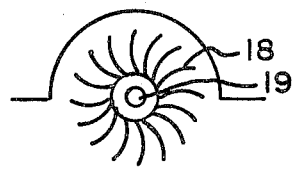
FIG. 9 provides an end view of the impellor of this invention, as disclosed in FIG. 8.
Figure 14:
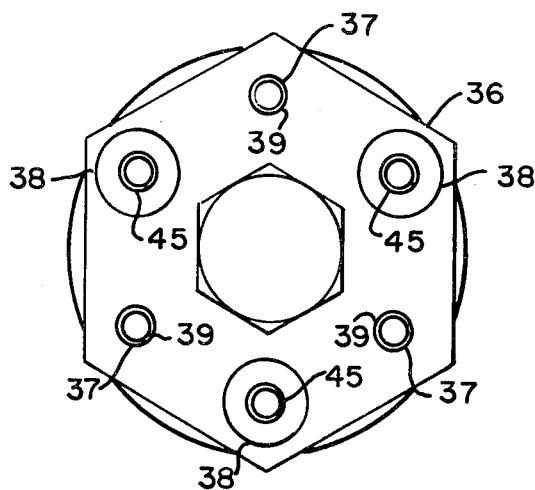
FIG. 14 provides a sectional view taken through the noise absorbing coupler along the line 14—14 of FIG. 13.
Figure 15:
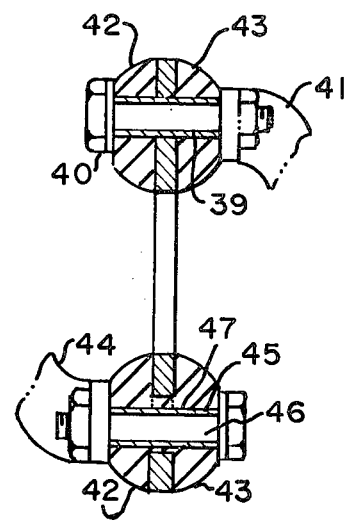
FIG. 15 provides a vertical sectional view taken through the vibrations absorbing coupler shown in FIG. 13.
Figure 16:
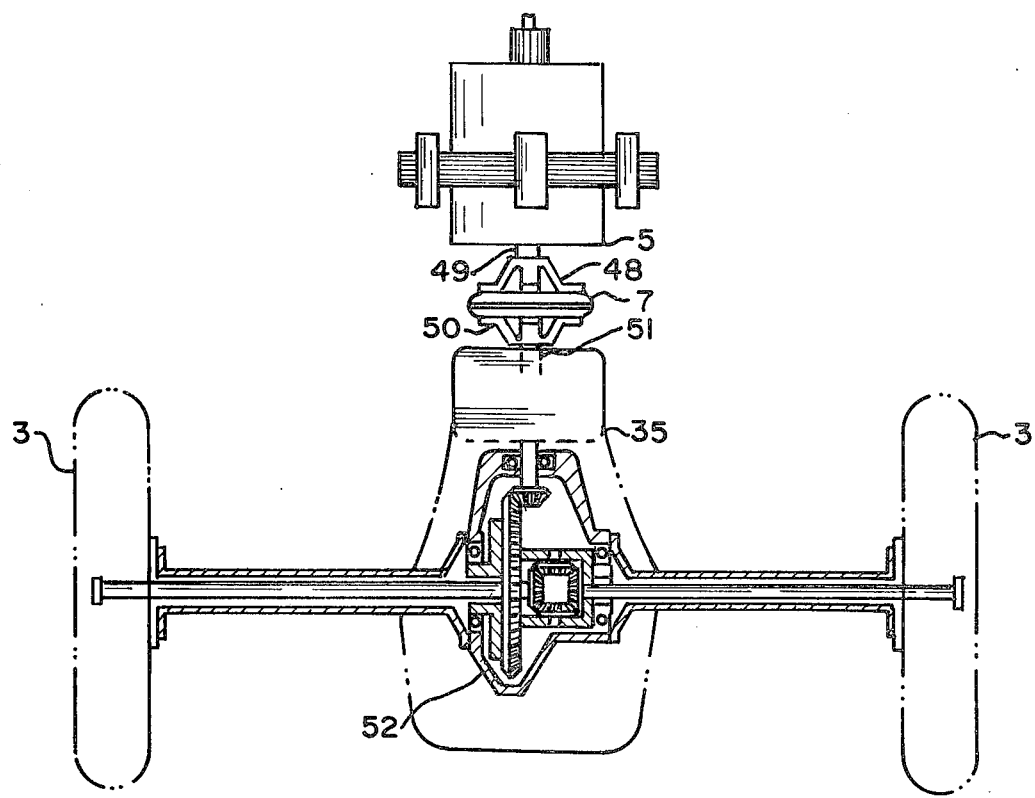
FIG. 16 provides a plan view of a front wheel form of drive connecting with the engine of this invention through the intermediary of the noise absorbing coupler.

The noise absorbing coupler 7 of this invention is disclosed in its various installations within the vehicle, and as seen in FIGS. 5 and 6, is arranged intermediate the electric motor 5 and its transmission 6, with said coupler being shown in greater detail in FIGS. 13 through 15. The reason, as previously analyzed, for the provision of such a coupler is to lessen the likelihood of transfer of any vibrations from the electric motor to and through its drive shaft, and to the associated gearing provided either in the transmission or other types of gear drives associated with this vehicle. As can be seen in said FIG. 13, which shows a rear wheel drive, the coupler 7 is provided within the drive shaft 33 of the vehicle, and this is the type of drive shaft that may be utilized within a vehicle where a rear wheel drive is specified, as aforesaid. The coupler, as herein shown, is arranged near the location of the bracket 34 that normally connects with the rear differential as employed within the standard automobile. Or, as can be seen in FIG. 16, the coupler 7 is shown disposed intermediate the electric motor 5 and the front wheel gearing drive 35, which may be structured in the nature of a differential to furnish drive to the pair of front wheels 3 of this invention. In any event, the coupler 7 includes a plate 36 which may be formed as a quarter inch thick steel plate, and which plate includes a series of smaller apertures 37, and larger apertures 38 precisely spaced around its circumference. Each of the smaller apertures includes a sleeve 39 therethrough, and a retaining means 40 is disposed therethrough for securing one arm of a spider connection 41 thereto. Actually, the arms of this spider connection may be three in number, and each arm 41 connects by way of the retaining means 40 through the apertures 37 provided through the plate 36. This particular spider connection 41 is also shown in FIG. 13 as connecting with the back end of the drive shaft 33 for the rear wheel drive vehicle. Also provided surrounding either side of the plate 36 are a pair of elastomeric annuluses 42 and 43, and which annuluses act in the form of cushioning means to dampen any of the vibrations generated by the motor, and prevent their transfer to and through the drive shaft 33. The spider connection securing to the other side of the noise absorbing coupler 7 also includes a series of arms 44, and this particular spider secures to the drive shaft 33 that eventually connects with the electric motor 5. The connection of these arms 44 of the spider to the plate 36 is somewhat similar to the connection of the arms 41 thereto, in that there is also included a sleeve 45 that is retained by means of a fastening means 46 through the larger apertures 38 provided spacedly around the plate 36. The difference, though, is that these apertures 38 are larger than the apertures 37, and when the sleeves 45 are disposed therethrough, there is ample spacing between the outer perimeter of the sleeve 45 and the aperture 38, and within this space a portion of the elastomeric annuluses 42 and 43 extend so as to provide a cushioned connection between the arms 44 of the spider and the plate 36. Thus, there is no metal contact between the spider arms 44 and the plate 36, but rather, all securement is made through the intermediate disposition of the elastomeric material of the annuluses 42 and 43 that extend within the outer portion of apertures 38, as can be seen at 47. The reason for the use of the sleeves 45 and 39 is to provide a reinforcement in the connection between the arms 41 and 44 to the plate 36, whereas, without said sleeves, there is every likelihood that the elastomeric material, such as rubber, forming the annuluses 42 and 43 would rapidly deteriorate and fail under the stress of the constant torque generated by the motor in providing for the rotation of the drive shaft 33, as with the rear wheel drive, or with the shaft extending from the transmission 6, as also shown in FIGS. 5 and 6. Thus, with the extension of the rubber or other elastomeric material 47 within this aperture spacing 47, and with the spider arm 44 being that connector which secures with the output shaft of the motor 5, any vibrations or other noise producing impact occurring by operation of the motor 5 will be dampened through the functioning of this coupler 7.

By referring to FIG. 16, it can be seen that the coupler 7 secures by means of its spider 48 to the output shaft 49 of the electric motor 5, whereas the spider connection 50 securing to the opposite side of the coupler 7 secures to the shaft 51 that extends into and intermeshes with the gear means 52 of the differential-like drive that provides rotation for the front wheels 3 of the vehicle, as where a front wheel drive is required.

Figure 17:
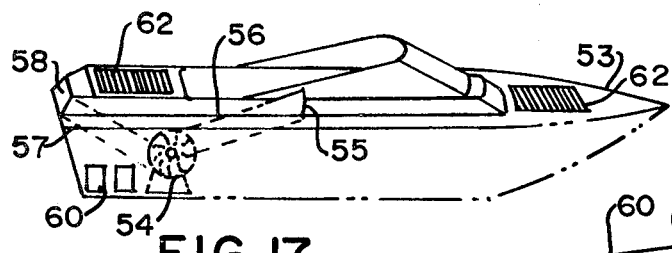
FIG. 17 discloses the application of both the impellor driven alternator and the solar energy recharger of this invention as modified and adapted for use in a boat.
Figure 18:
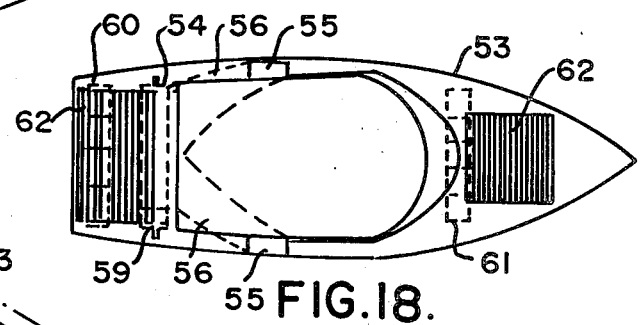
FIG. 18 provides a plan view of the invention as shown in FIG. 17.

As previously briefly analyzed, the concept of this invention may be incorporated within other types of vehicles, such as the boat 53 shown in FIG. 17 and 18. As disclosed, an impellor 54 is disposed extending approximately the width of the transom of the boat near its stern, with the boat having intake ports 55 that provide air intake into the ductwork 56 that furnish the wind force necessary for impressing against the upper side of the said impellor 54 to achieve its turning, with the air then attaining its egress from the ductwork by way of the rear passage 57 that is vented at the outlet 58 to the atmosphere. The impellor 54 connects with the generator 59, of the type previously analyzed, and which provides for a recharging of the bank of batteries 60, or 61. Likewise, solar plates 62 are disposed for reception of the sun's rays so as to generate an electric charge upon their silicon plates that is also useful for recharging of the group of batteries 60 and 61.

Figure 19:
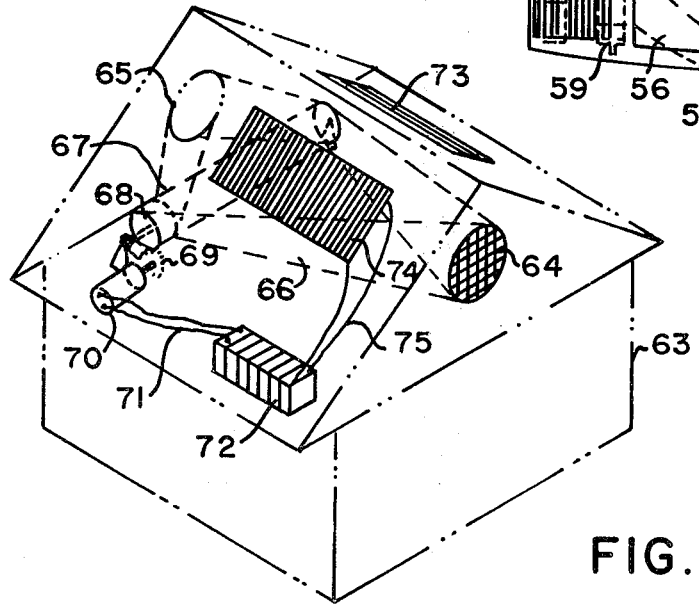
FIG. 19 discloses the application of the impellor driven alternator and the solar energy recharger of this invention as modified and adapted for use in a residence; and, FIG. 20 discloses a circuit diagram of the various batteries and relays utilized within the vehicle of this invention so as to attain power for operation of its variable speed motor when incorporated within an automobile.

FIG. 19 discloses the application of these two aforesaid recharging means as installed within a residence 63. The attic portion of the residence may include an intake port 64 and an outlet port 65 that have ductwork 66 arranged therethrough so as to allow any wind or air passing through the residence at this location to impinge upon the upper side of the impellor 67, and upon a rotation of the impellor in this manner, its lateral gear 68 may intermesh with another gear 69 that is provided upon the generator 70 so that as the impellor turns, the generator will likewise be rotated for inducing an electric charge that is conducted through the circuit lines 71 to the bank of batteries 72. Likewise, a pair of solar energy rechargers 73 and 74 are disposed upon the roof of the residence so as to absorb any sunlight upon its arranged silicon plates and convert the same to an electric charge that is conducted through the circuit lines 75 also for recharging of the bank of batteries 72. Thus, the stored electric charge within the batteries 72 may then be used for energizing of various electrical appliances provided within a residence, in addition to its heating and air conditioning system, so as to provide for a total electric home.

Figure 11:
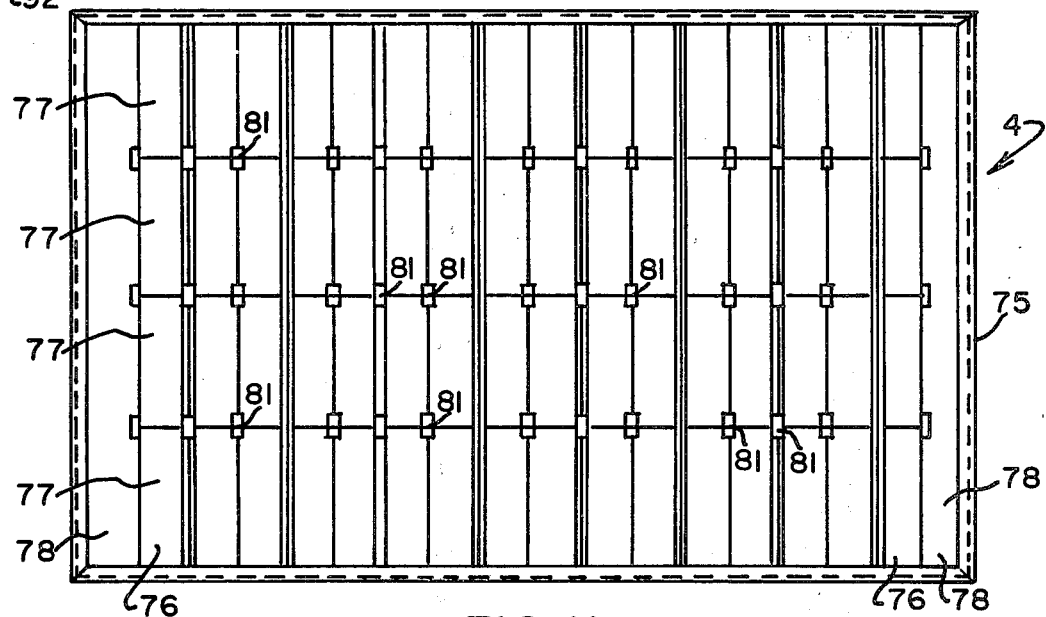
FIG. 11 provides a plan view of the solar energy recharger of this invention.
Figure 12:
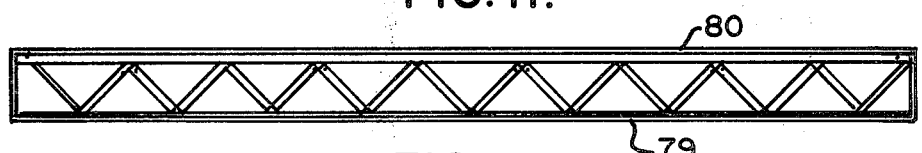
FIG. 12 provides an end view of the solar energy recharger disclosed in FIG. 11, with its side frame being removed to disclose the angular arrangement of its silicon plates therein.

The solar energy recharger 4 of this invention is more aptly disclosed in FIGS. 11 and 12, and as shown it includes a perimeter frame 75 that comprises a highly polished chrome alloy frame, and has arranged therein a series or rows of solar plates. Each row 76 incorporates four lengths of silicon plates 77 that are interconnected together, with there being 16 rows of said plates along the overall width of the charger 4. An apron of polished metal, as at 78, is provided angularly at either end of the recharger, so as to provide for a directional reflection of the sunlight inwardly at these locations. Each of the solar panels 77 is designed to generate approximately 500 milliamps of current, at 12 volts of potential per panel. Thus, each row 76 of the silicon plates can provide a potential of 48 volts, at 500 milliamps, which means that the entire solar charger, along its width, can create 8 amps of current, at a 48 volts potential. Each row 76 is connected in parallel, so that the voltage along a row prevails as the potential out-put for the entire recharger, whereas, the amperage generated is cumulative, furnishing 8 amps of current from the entire solar recharger. The bracket 75 surrounding the charger includes a bottom cover 79, and there may be provided a cover 80 upon the top of the charger so as to shelter from the elements, and which cover may comprise a sheet of plexiglas or other transparent material which offers no resistance to the passage of sunlight therethrough. Furthermore, and so as to eliminate condensation from developing within the recharger, there are a series of slots, as at 81, and which slots act to induce a hydroventing of the charger particularly during the operations of the vehicle, so that as air passes over the same during its movement, there is developed a slight low pressure attraction that draws some atmosphere from within the recharger. Preferably, this charger 4 will be recessed within the roof, or other body parts, of the automobile, as shown in FIG. 1, and therefore, the bracket 75 around the perimeter of the charger may also include some slots (not shown) so as to stimulate this hydroventing of any moisture from within the same.

The solar plates 77 are generally designed as silicon plates, and these plates are of the type that may be acquired from the International Rectifier Company, of El Segundo, California, or from Edmund Scientific Company, of Barrington, New Jersey.

Figure 10:
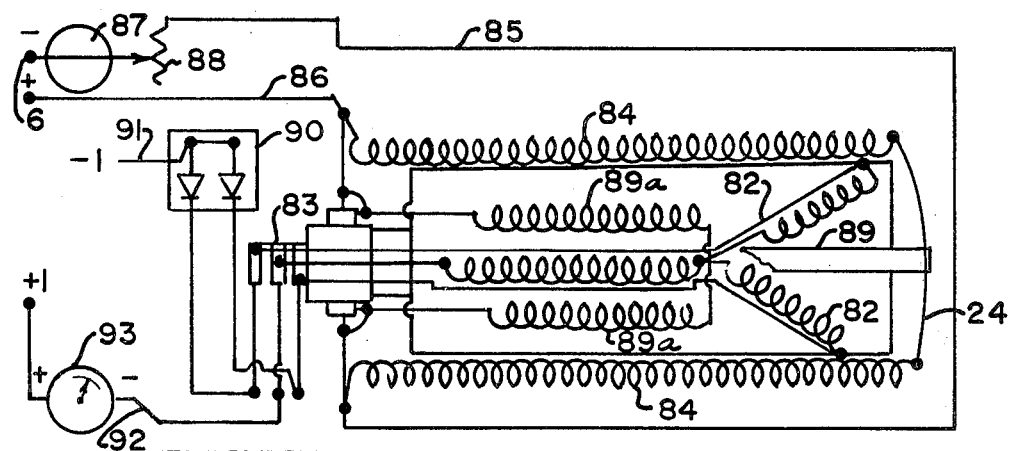
FIG. 10 provides a wiring diagram for the alternator of this invention, as associated with the impellor shown in FIG. 8.

The alternator 24 associated with the impellor of the vehicle is more accurately disclosed, circuitwise, in FIG. 10. This alternator 24 includes the three phase windings 82 associated with the armature of the apparatus, and includes the usual slip rings 83 that provide for the tapping of the generated electricity from the armature. Field excitor coils 84 are provided in the stator portion of the alternator so as to reduce the amount of drag upon the alternator during its operations, and therefore, reduce the force necessary to achieve a turn of its operatively associated impellor. As previously commented, the alternator being used in the preferred embodiment is a three phase, direct current excited unit, with, as previously commented, the drag upon the alternator being controlled by the amount of voltage applied to its excitor coils 84. The circuit lines providing for the transfer of charge to the field coils 84 of the alternator are provided at 85 and 86, with the circuit line 85 having a meter 87 therein, with the rheostat 88 providing for the aforesaid type of regulation of the voltage across these coils. The shaft 89 of the alternator may directly couple with the shaft 19 of the impellor 15, or the shaft may be intergeared to the same in the manner as disclosed in the residential use of this invention as shown in FIG. 19. The armature exciter coils 89a cooperate with the aforesaid windings 84 so as to create the generation of electrical charge within the armature, with the slip rings 83 providing the means for conducting the charge through the rectifier 90 and to the various batteries to attain their recharging, by way of circuit line 91. The other circuit line 92 of the center tap slip ring has a meter 93 provided therein so as to determine the amount of amperage being drawn by the batteries during their recharging, with said circuit line 92 being grounded. This alternator, during the routine operations of the vehicle, and traveling at an average speed, as for example, 35 mph, will create a potential of 48 volts, and provide for an amperage draw of approximately 50 amps, whereas, when the vehicle may be traveling at higher speeds, an amperage as much as 70 amps may be drawn from the alternator for recharging of the said batteries.

Figure 20:
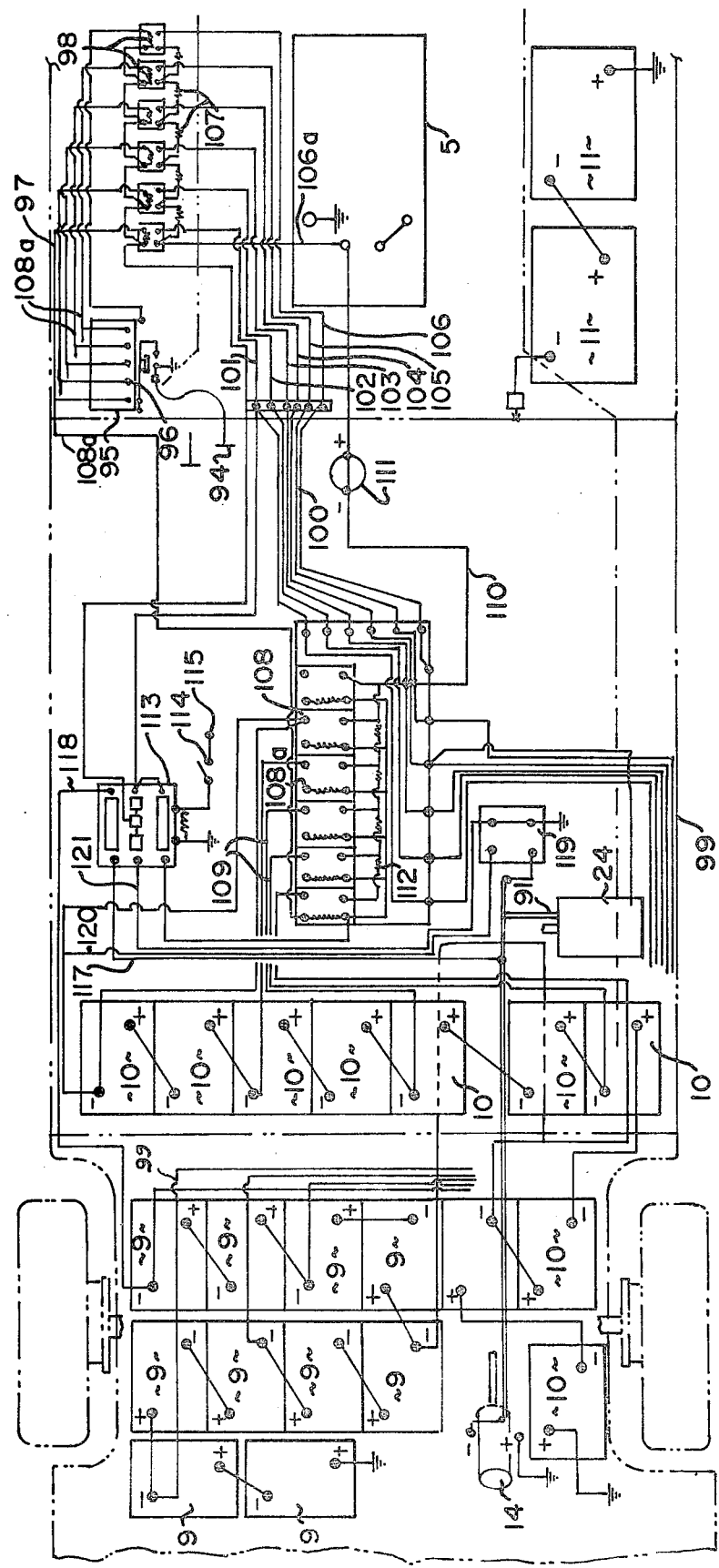

The overall circuit diagram for the electrical operations of either the vehicle or the boat, as shown in the drawings, is further disclosed in detail in FIG. 20. The bank of main batteries 9 and the auxiliary batteries 10 are disclosed in their relationship within the circuitry. In addition, a pair of accessory batteries 11 are further disclosed within this diagram. The variable speed direct current electric motor 5 is shown provided at the front of the vehicle's wiring diagram, while the alternator 24, which attains its functioning from the air rotated impellor, is also disclosed. Furthermore, the auxiliary generator 14 is disclosed provided proximate the rear of the vehicle outline.

The accelerator pedal 94 is mechanically coupled to a slide contact 95, with each of the contacts 96 being connected by means of circuit lines 97 to a series of step relays 98 or 108, with the latter connections being made through circuit lines, such as 108a. As can be visualized, as the accelerator pedal is depressed, and the contact slide increases from one contact point 96 to another contact point 96, more of the relays 98 or 108 will be operatively associated within the circuitry of the invention, depending upon whether the batteries 9 or 10, respectively, are in the system. In the former instance, as this occurs, it can be seen that a series of circuit lines 99, which, incidentially, connect progressively with the main batteries 9, conduct their charge through the circuit lines 100 and through the associated relays 98 for the conduct of electrical charge, cummulatively, to achieve an operation of the motor 5. Each of the circuit lines 100 leading from the batteries 9 is designed to add an additional quantity of voltage and amperage into the system, so that the circuit lines 101 through 106 can progressively add from 12 to 72 volts potential through the relays 98 and onto the electrical motor 5, through the circuit line 106a, to attain a variation in its speed of operation. It should also be noted that there are a series of resistances 107 that are provided between each successive relay 98, and these resistances are designed to smooth out the exposure of the stepped voltages added to and impressed upon the electric motor, so that there is not a distinct disparity in the speed of operation of the vehicle as the voltages are increased, as through the actuation and addition of relays 98 into the system, or even as the vehicle speed decreases, as through a let up upon the accelerator pedal 94. These resistances 107 have further attributes within the scope of this invention, as will be subsequently described.

In the event that the auxiliary bank of batteries 10 is added into the system, as in place of the use of the charge from the main bank of batteries 9, potential from these batteries 10 is provided through its series of stepping relays 108 that connect through their circuit lines 109 to the various batteries 10. In this instance, the accelerator pedal 94 provides for the stepped increase in the voltages across the motor 5 by providing for an increase in the addition of relays 108 into the system, corresponding to the degree of depression of the accelerator pedal. And, as added relays 108 are accumulatively inserted into the circuitry, it provides for a stepped increase in the amount of potential from additional batteries 10 conducted through the circuit line 110 and to electric motor 5. A meter 111 may be provided within the circuit line so as to disclose the amount of amperage being drawn by the motor during its operations, and such a meter may be disposed for convenience upon the dashboard of the vehicle. In part, this meter could even be converted into operating as a speedometer. Once again, a series of resistances 112 are provided between each relay 108 so as to smooth out the added potentials that are impressed upon the electrical motor 5, as the accelerator pedal is either increasingly depressed, or released, so that there is not a distinct steppage in the acceleration or deceleration of the vehicle as each relay, and its associated battery, is either added, or deducted, from the system.

A switching relay 113 functions as a control source for determining which bank of batteries energizes the engine, and which other bank of batteries is being recharged at a given instance. A switch 114 may be either manually operated, or actuated by a meter that determines when the operating bank of batteries may have a reduced charge that is not sufficient to drive the electric motor 5 at full capacity, and when this switch is closed, its circuit line 115 connects with an approximate twelve voltage source to pull the switch 113 down, for connecting various circuit lines into the system. When this condition exists, a charge may be conducted through the switch 113 and to the selected bank of batteries for recharging. This switch 113 comprises a triple pole, double throw type of switch, so that when its poles are down, they provide for the conduct of charge from the alternator 24, through the circuit line 117 and through the said switch, and to the circuit line 118 for providing a recharging of the main batteries 9, while the auxiliary batteries 10 are supplying their charge through the bank of relays 108 for providing operations to the motor 5. On the other hand, when the relay switch 113 is released, as by an opening of the switch 114, it allows for a charge to be conducted from the circuit line 91 of the alternator (see also FIG. 10) through the relay switch 119, which allows for a transfer of charge through the circuit line 120 for charging the negative side of the auxiliary batteries 10. The switch 119 is energized by means of a charge being delivered from the switch 113 and through the line 121 for actuating this switch to achieve such.

A few other items concerning the circuit diagram 20 of this invention should be analyzed. For example, a charge is continuously tapped from the circuit line 104 that provides a 48 volt potential that is available for continuously energizing the excitation coils 84 and 89 of the alternator, so as to maintain its most efficient operations at reduced drag. Furthermore, it may be commented that the various resistances 107, and/or 112, associated with the relays 89 and 108, may be enclosed within a confining package (not shown), with the heat generated from said resistances being conducted into the heating system of the automobile so as to provide instant heat for warming of the vehicle particularly during the cold winter months. In addition, the normal air conditioning system for an automobile may be coupled to the electrical motor 5, as through the agency of a v-belt, and be operated as desired for conducting conditioned air to the vehicle for cooling the same during the hot summer months. These are just examples of the versatility of the circuit diagram for this vehicle, and how its various components may be used for supplemental operations that have become standard for vehicle usage.

Various modifications to this invention may occur to those skilled in the art upon reviewing the definition of this invention. Any such modifications, if within the spirit and scope of the invention, and encompassed by the claims appended hereto, are intended to be protected by any United States patent issuing upon this invention. The description of the preferred embodiment is set forth for illustrative purposes only.

Having thus described the invention what is claimed and desired to be secured by Letters Patent is:

1. An electric powered vehicle incorporating both front and rear wheels, and having a bank of rechargeable batteries from which electrical energy necessary for vehicle operation is obtained, comprising an electric motor operatively associated with one of said front and rear wheels, said motor being energized by said batteries, gearing means interconnected with said motor means and being driven in rotation therefrom for inducing a rotation of the associated wheels, a vibrations absorbing coupler interconnected between said motor and gearing means to cushion the noises of vibration effected from the motor operations, an impellor having a width approximating the vehicle width and being bearing mounted to the said vehicle, a lower portion of said impellor being partially exposed at the underside of the vehicle for turning during vehicle movement under the influence of the air passing under said vehicle while minimizing the impellor resistance against vehicle movement, the remaining upward portion of said impellor being located within the vehicle framework and unexposed to the passing air, and an alternator operatively associated with the said impellor and provided for simultaneously generating an electric charge during the turning of the said impellor, said alternator provided for also selectively recharging of said batteries.

2. The invention of claim 1 wherein said vehicle incorporates a front wheel drive, and the gearing means comprises a vehicle transmission.

3. The invention of claim 1 wherein said vehicle incorporates a front wheel drive, and the gearing means comprises a differential gearing.

4. The invention of claim 1 wherein said vehicle incorporates a rear wheel drive, and the gearing means comprises a vehicle transmission.

5. The invention of claim 1 wherein said vehicle incorporates a rear wheel drive, and the gearing means comprises a differential gearing.

6. The invention of claim 1 and including an air duct arranged along the underside of the vehicle, said duct being disposed for passing air therethrough as during vehicle movement, the proximate lower half of the impellor being disposed within the said duct to achieve its said turning during vehicle movement.

7. The invention of claim 6 wherein said air duct includes an intake portion, said intake portion being arranged forwardly of the said impellor.

8. The invention of claim 7 wherein said intake portion is disposed upwardly from the lowest portion of the impellor.

9. The invention of claim 6 wherein said air duct includes an outlet portion, said outlet portion being arranged rearwardly of the said impellor.

10. The invention of claim 7 and including a guard extending across the intake portion of the duct to prevent the entrance of debris into the said duct during vehicle movement.

11. The invention of claim 1 wherein said impellor includes a series of vanes, said vanes being arcuate in their extension approximately radially from the center of the impellor.

12. The invention of claim 1 wherein said impellor includes a center rotatable shaft located at least approximate its ends and being arranged approximately perpendicularly with respect to the length of the vehicle, said alternator operatively associated with the impellor also including an armature shaft, said armature shaft being connected axially aligned with the impellor shaft for simultaneous movement during impellor rotation.

13. The invention of claim 12 wherein the alternator comprises a three-phase direct current excited alternator.

14. The invention of claim 1 wherein said impellor includes a center rotatable shaft at least proximate its ends and being arranged approximately perpendicularly with respect to the length of the vehicle, said alternator operatively associated with the impellor also including an armature shaft, said impellor shaft and armature being coaxial, and gearing interconnected between said shafts to achieve simultaneous rotation during vehicle movement.

15. The invention of claim 14 wherein the alternator comprises a three-phase direct current excited alternator.

16. The invention of claim 1 wherein said electric motor includes a plurality of field coils, an armature disposed for rotating therein under the influence of the electromotive force generated by the said field coils, and a significantly opened stator frame for supporting the said field coils in spaced relationship around the said armature.

17. The invention of claim 16 wherein the stator frame includes a perimeter frame only surrounding the armature approximately at its midpoint, said frame including an integral base plate for securement to the vehicle for rigidly stabilizing the electric motor in place as during vehicle operation whereby said motor exhibits reduced weight characteristics.

18. The invention of claim 17 wherein said stator frame is formed of cast iron.

19. The invention of claim 17 wherein there are four fields spaced equally distant around the periphery of the said armature, said fields being fixed to the perimeter frame.

20. The invention of claim 19 and including an accessory battery provided upon the vehicle, one of said fields including an extra coil, circuit lines interconnecting between said coil and the said accessory battery to effect its selective recharging during functioning of the electric motor.

21. The invention of claim 1 wherein said vibrations absorbing coupler includes a plate member, said plate member having a series of apertures provided therethrough, a sleeve disposed through each formed plate aperture, a connector secured to certain of said aperture disposed sleeves, and said connector fastening to the motor, another connector secured to the other of said aperture disposed sleeves, said other connector fastening to the gearing means, and a cushioning means disposed within the apertures between the plate and the sleeves associated with one of the connectors to dampen the vibrations effected during motor operation, said cushioning means disposed within the apertures between the plate and the sleeves associated with the connector fastening to the motor, said cushioning means including a pair of elastomeric annuluses, with one of each annulus being concentrically disposed to either side of the apertured plate.

22. The invention of claim 21 and wherein each connector secures at approximately three equally spaced nonaligned locations to either side of the said apertured plate.

23. The invention of claim 22 wherein said elastomeric annuluses are formed of rubber.

24. The invention of claim 1 and including an electrical energy producing solar panel being surface exposed on said vehicle and provided for selectively recharging said batteries.

25. The invention of claim 24 wherein said solar panel includes a perimeter frame, and a plurality of silicon plates being angularly arranged with respect to each other for exposure in more than one direction, said plates being electrically connected together for generating electricity for recharging of the said bank of batteries.

26. The invention of claim 25 wherein the solar panel is capable of generating approximately 48 volts and 8 amps current.

27. The invention of claim 25 wherein said silicon plates are arranged approximately at a 45° angle with respect to their perimeter frame.

28. The invention of claim 1 wherein said vehicle comprises an automobile.

29. The invention of claim 1 wherein said vehicle comprises a truck.

30. The invention of claim 1 wherein said vehicle comprises a tractor.

31. The invention of claim 1 and including circuitry for said electric powered vehicle, said circuitry including a bank of main batteries, a bank of auxiliary batteries, said electric motor being electrically connectable to one of said bank of batteries to receive a charge of electrical energy when operating, a series of relays connected to said batteries, an accelerator provided in the vehicle and when actuated providing for a sequential actuation of the said relays and a variation in the quantity of electrical energy transmitted to the motor to vary its speed of revolution.

32. The invention of claim 31 wherein there are a series of relays associated with each bank of batteries, and a switch provided for regulating the selection of the bank of batteries and cooperating relays for energization of the electrical motor.

33. The invention of claim 32 and including a relay switch provided in said circuitry, and said relay switch upon actuation providing for selection of a bank of batteries for recharging from the alternator when operating.

34. The invention of claim 31 and including resistance connecting between each relay provided in the series of relays, said resistances providing a smoothing in the variation of the quantity of electrical energy added into the circuitry upon actuation of one or more relays when increasing and decreasing the energization of the direct current motor.

35. The invention of claim 34 and including a housing surrounding the said resistances, with the inherent heat generated by the resistances during their operation being collected for selectively heating the interior of the said vehicle.

* * * * *